United States Patent
Herrera

(10) Patent No.: US 10,720,135 B2
(45) Date of Patent: Jul. 21, 2020

(54) ACOUSTIC PANELS THAT INCLUDE MULTI-LAYER FACESHEETS

(71) Applicant: The Boeing Company, Chicago, IL (US)

(72) Inventor: Eric Herrera, Mukilteo, WA (US)

(73) Assignee: The Boeing Company, Chicago, IL (US)

(*) Notice: Subject to any disclaimer, the term of this patent is extended or adjusted under 35 U.S.C. 154(b) by 661 days.

(21) Appl. No.: 15/434,378

(22) Filed: Feb. 16, 2017

(65) Prior Publication Data

US 2018/0018952 A1 Jan. 18, 2018

Related U.S. Application Data

(63) Continuation-in-part of application No. 15/212,454, filed on Jul. 18, 2016, now Pat. No. 10,443,496.

(51) Int. Cl.

| | |
|---|---|
| *B29C 70/54* | (2006.01) |
| *G10K 11/168* | (2006.01) |
| *B64D 33/02* | (2006.01) |
| *B29C 65/16* | (2006.01) |
| *B29C 70/38* | (2006.01) |
| *B32B 3/12* | (2006.01) |
| *B32B 27/20* | (2006.01) |
| *G10K 11/16* | (2006.01) |

(Continued)

(52) U.S. Cl.
CPC ............ *G10K 11/168* (2013.01); *B29C 65/16* (2013.01); *B29C 70/382* (2013.01); *B29C 70/54* (2013.01); *B32B 3/12* (2013.01); *B32B 27/20* (2013.01); *B64D 33/02* (2013.01); *G10K 11/161* (2013.01); *B29K 2307/04* (2013.01); *B29K 2701/12* (2013.01); *B29K 2995/0002* (2013.01); *B29L 2007/002* (2013.01); *B32B 2307/102* (2013.01); *B32B 2607/00* (2013.01); *B64D 2033/0206* (2013.01)

(58) Field of Classification Search
CPC .... G10K 11/168; G10K 11/161; B29C 65/16; B29C 70/382; B29C 70/54; B32B 3/12; B32B 27/20
See application file for complete search history.

(56) References Cited

U.S. PATENT DOCUMENTS

| | | | |
|---|---|---|---|
| 5,217,556 A | 6/1993 | Fell | |
| 5,421,935 A | 6/1995 | Dixon et al. | |
| | (Continued) | | |

OTHER PUBLICATIONS

U.S. Appl. No. 15/212,454 to Eric Herrera et al., filed Jul. 18, 2016.

(Continued)

*Primary Examiner* — Daniel McNally
(74) *Attorney, Agent, or Firm* — Duft & Bornsen, PC

(57) ABSTRACT

Systems and methods are provided for fabricating acoustic panels. One embodiment is a method comprising acquiring a core of acoustic cells, and fabricating a facesheet covering the core by: dispensing a base layer of material atop the acoustic cells while leaving openings into each of the acoustic cells, covering the openings by applying a liner of porous material atop the base layer, dispensing a cap layer of material atop liner while leaving gaps in the cap layer over the acoustic cells, and fusing the cap layer to the liner by directly radiating laser energy onto locations where the cap layer has been dispensed.

9 Claims, 11 Drawing Sheets

(51) Int. Cl.
  *B29K 307/04* (2006.01)
  *B29K 701/12* (2006.01)
  *B29L 7/00* (2006.01)

(56) References Cited

U.S. PATENT DOCUMENTS

| | | |
|---|---|---|
| 5,543,198 A | 8/1996 | Wilson |
| 6,371,242 B1 | 4/2002 | Wilson et al. |
| 6,609,592 B2 | 8/2003 | Wilson |
| 6,827,180 B2 | 12/2004 | Wilson |
| 6,840,349 B2 | 1/2005 | Andre et al. |
| 7,484,592 B2 | 2/2009 | Porte et al. |
| 7,921,966 B2 | 4/2011 | Chiou et al. |
| 7,946,385 B2 | 5/2011 | Lalane et al. |
| 8,397,865 B2 | 3/2013 | Douglas et al. |
| 8,820,477 B1 | 9/2014 | Herrera et al. |
| 9,604,438 B2 | 3/2017 | Lumbab et al. |
| 9,640,164 B2 | 5/2017 | Gerken et al. |
| 9,693,166 B2 | 6/2017 | Herrera et al. |
| 2004/0016595 A1* | 1/2004 | Andre ............... G10K 11/172  181/290 |
| 2006/0151108 A1* | 7/2006 | St. Denis ............ B32B 37/04  156/309.9 |
| 2009/0045009 A1* | 2/2009 | Chiou ............... G10K 11/168  181/290 |
| 2014/0027199 A1* | 1/2014 | Claeys ............... G10K 11/172  181/290 |
| 2015/0373470 A1 | 12/2015 | Herrera et al. |
| 2016/0009067 A1 | 1/2016 | Gerken et al. |
| 2016/0253986 A1 | 9/2016 | Gerken et al. |

OTHER PUBLICATIONS

HexWeb Acousti-Cap; http://www.hexcel.com/products/aerospace/aacousti-cap, Jun. 17, 2016.

\* cited by examiner

US 10,720,135 B2

ACOUSTIC PANELS THAT INCLUDE MULTI-LAYER FACESHEETS

FIELD

The disclosure relates to the field of acoustic control, and in particular, to panels that provide acoustic control such as attenuating acoustic energy as a function of frequency.

BACKGROUND

Aircraft engines produce a great deal of noise during takeoff, flight, and landing. In order to increase passenger comfort and provide a more pleasant experience during flight, acoustic paneling may be provided that dampens and/or redirects noise from the engines during takeoff, flight, and landing. Acoustic paneling within an aircraft may further be utilized to reduce/redirect aircraft noise away from bystanders that may be proximate to the aircraft during takeoff and landing.

Acoustic paneling may comprise a structure specifically designed to absorb, control or reflect sound away from a sensitive area. Ideally, acoustic paneling for an aircraft would be sufficient to completely absorb noise perceived by passengers from engines and other components. However, such an amount of acoustic paneling for an aircraft would be very heavy and/or occupy a substantial amount of space within the aircraft, which in turn increases the expense of transporting passengers. Furthermore, acoustic paneling is often painstakingly assembled cell by cell in order to conform to the complex geometries of an aircraft. Such labor intensive processes further increase the expense of manufacturing the aircraft, and are therefore undesirable. Hence, designers of aircraft carefully balance concerns of comfort and cost when adding acoustic paneling to an aircraft.

SUMMARY

Embodiments described herein provide techniques and automated manufacturing processes that utilize (e.g., thermoplastic) material to mass fabricate multi-celled acoustic paneling for aircraft. Specifically, embodiments provided herein enable acoustic paneling to be automatically fabricated via three dimensional (3D) printing and/or Automated Fiber Placement (AFP) techniques. A thermoplastic facesheet with porous sections is applied over a core of acoustic cells, and portions of the facesheet are fused into place onto the cells via a laser. Using this fabrication technique, the speed of creating the acoustic panel may be beneficially increased, and costs may be reduced. The acoustic panels discussed herein provide a further benefit because they are capable of undergoing plastic deformation (e.g., via the application of localized heat and pressure) in order to conform to complex surfaces within an aircraft (e.g., an engine cowling), even after fabrication is complete.

One embodiment is a method comprising acquiring a core of acoustic cells, and fabricating a facesheet covering the core by: dispensing a base layer of material atop the acoustic cells while leaving openings into each of the acoustic cells, covering the openings by applying a liner of porous material atop the base layer, dispensing a cap layer of material atop liner while leaving gaps in the cap layer over the acoustic cells, and fusing the cap layer to the liner by directly radiating laser energy onto locations where the cap layer has been dispensed.

A further embodiment is a non-transitory computer readable medium embodying programmed instructions which, when executed by a processor, are operable for performing a method. The method includes acquiring a core of acoustic cells, and fabricating a facesheet covering the core by: dispensing a base layer of material atop the acoustic cells while leaving openings into each of the acoustic cells, covering the openings by applying a liner of material atop the base layer, dispensing a cap layer atop the liner while leaving gaps in the cap layer over the acoustic cells, and fusing the cap layer to the liner by directly radiating laser energy onto locations where the cap layer has been dispensed.

A further embodiment is a system that includes an Automated Fiber Placement (AFP) machine. The AFP machine includes a kinematic chain of actuators and rigid bodies, and an end effector. The end effector includes a dispenser that dispenses material, and a laser that radiates laser energy which fuses the material. The AFP machine further includes a controller that operates the end effector to operate in accordance with instructions in a Numerical Control (NC) program that directs the AFP machine to acquire a core of acoustic cells, and fabricates a facesheet covering the core by: dispensing a base layer of material atop the acoustic cells while leaving openings into each of the acoustic cells, covering the openings by applying a liner of porous material atop the base layer, dispense a cap layer of material atop the liner while leaving gaps in the liner over the acoustic cells, and fuse the cap layer to the liner by directly radiating laser energy onto locations where the cap layer has been dispensed.

A further embodiment is a method for performing acoustic control of jet engine noise via an acoustic panel. The method includes receiving airflow across openings of a facesheet of the panel, maintaining laminar airflow across the openings, directing the airflow into cells of the acoustic panel via the openings in the facesheet through a porous liner, absorbing energy from the airflow as the airflow travels within the cells.

A further embodiment is an apparatus comprising an acoustic panel. The panel includes a core comprising multiple cells having walls that are fused together, and a facesheet including multiple openings through which sound waves enter the cells, and a porous liner in the openings.

A further embodiment is a method for performing acoustic control of jet engine noise via an acoustic panel. The method includes receiving airflow across openings of a facesheet of the panel, arranging each of the openings with respect to airflow such that a dimension of the opening parallel to airflow is smaller than a dimension of the opening perpendicular to airflow, directing the airflow into cells of the acoustic panel via the openings in the facesheet through a porous liner, and absorbing energy from the airflow as the airflow travels within the cells.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
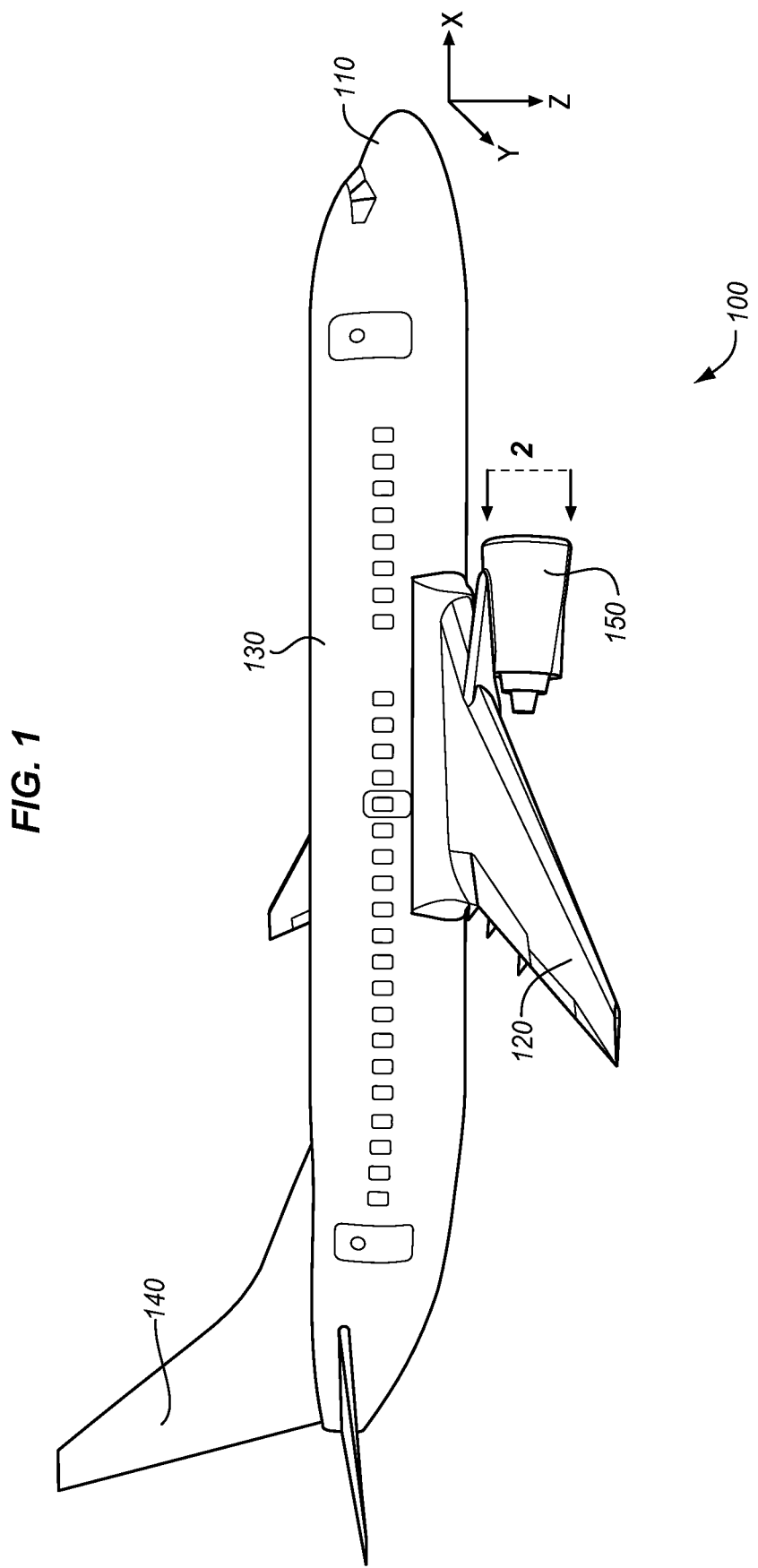
FIG. 1 is a diagram of an aircraft in an exemplary embodiment.
Figure 2:
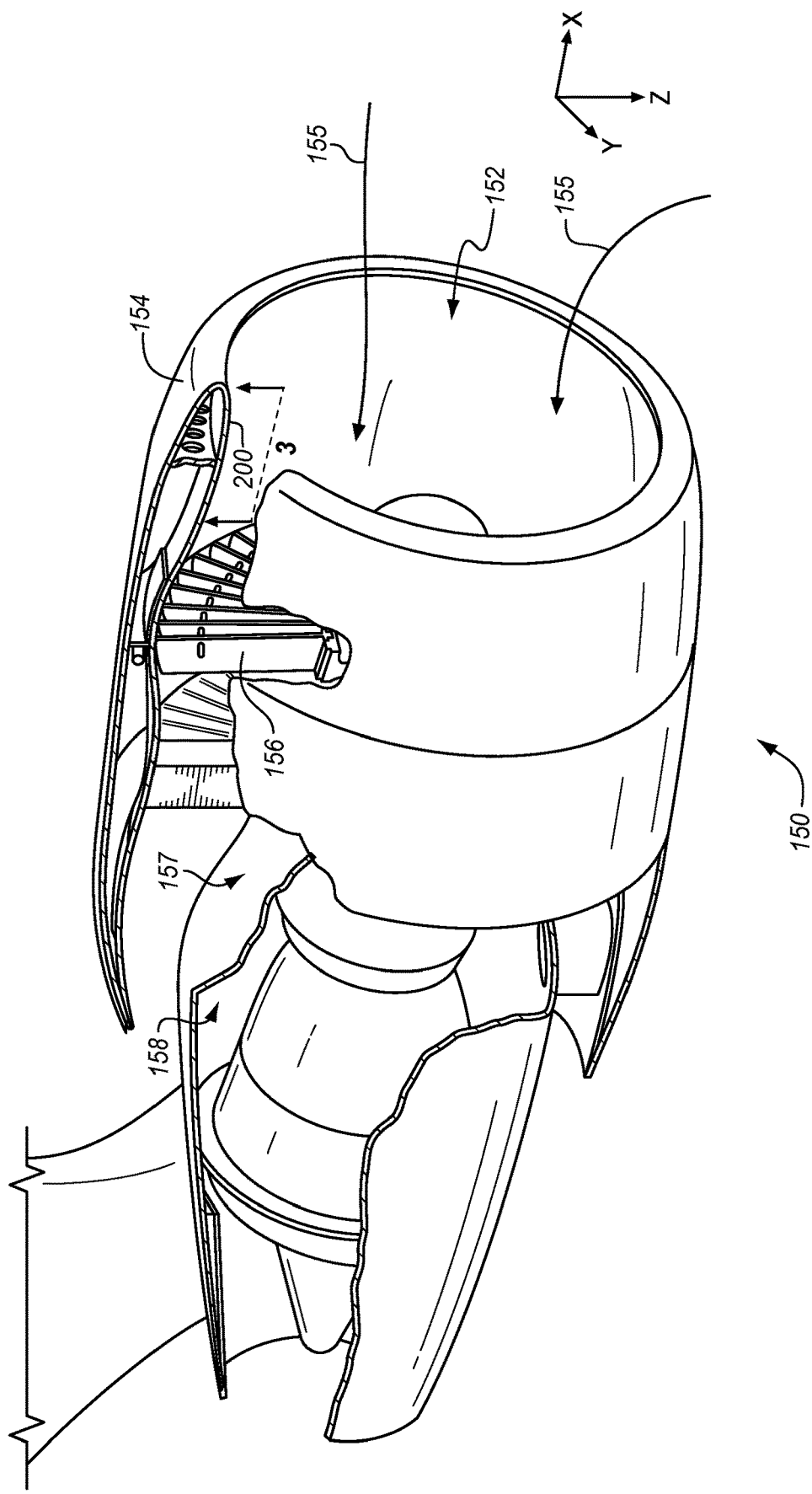
FIG. 2 is a diagram illustrating an engine of an aircraft in an exemplary embodiment.

FIGS. 1-2 illustrate environments that may benefit from enhanced acoustic control. Specifically, FIG. 1 is a diagram of an aircraft 100 in an exemplary embodiment. Aircraft 100 includes nose 110, wings 120, fuselage 130, tail 140, and engine 150 (e.g., a turbofan jet engine that generates noise perceptible to passengers). FIG. 1 also illustrates a downward direction (Z) for aircraft 100. FIG. 2 is a diagram of aircraft engine 150 indicated by view arrows 2 of FIG. 1. Engine 150 includes inlet 152 through which airflow 155 travels. Engine cowling 154 surrounds inlet 152, fan blades 156, compression section 157, and combustion section 158. As airflow 155 enters inlet 152 (e.g., during takeoff, flight, and landing), a substantial amount of noise is generated. This noise generated by inlet 152 may be audible to passengers inside of aircraft 100 at a level of volume that is undesirable. In order to control this noise, acoustic panel 200 is placed within inlet 152 such that sound waves within inlet 152 will be subject to control/attenuation by acoustic panel 200 which may include patterned openings that provide low drag. This beneficially increases passenger comfort, and low drag leads to airplane performance improvement, fuel burn etc.

Figure 3:
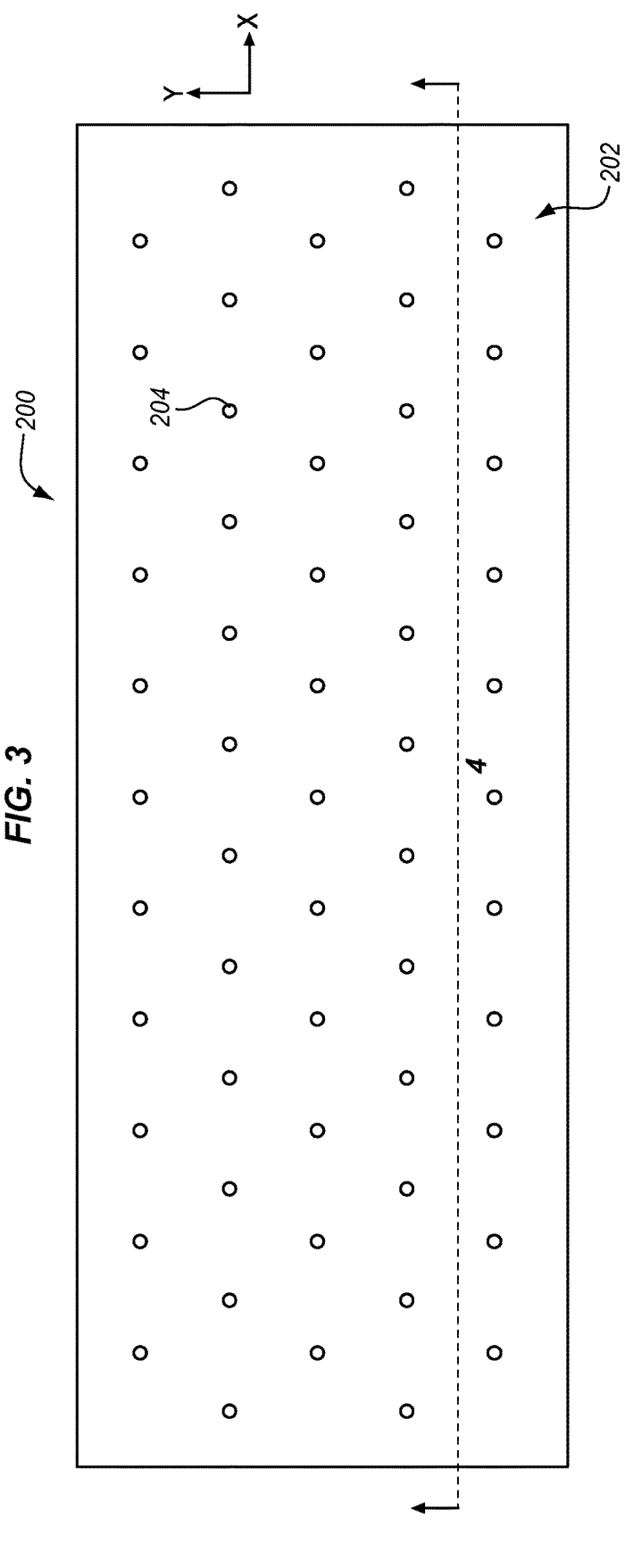
FIGS. 3-4 are diagrams illustrating a multi-celled acoustic panel in an exemplary embodiment.
Figure 4:
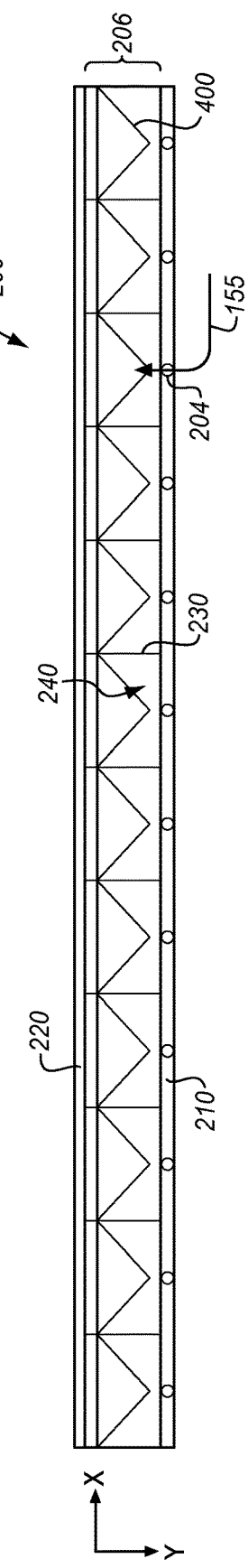

Further details of the features of acoustic panel 200 are described with regard to FIGS. 3-4. Specifically, FIGS. 3-4 illustrate a fully fabricated acoustic panel 200. FIG. 3 is an underside view of panel 200 that illustrates a view of a face 202 of panel 200 indicated by view arrows 3 of FIG. 2. As shown in FIG. 3 face 202 of acoustic panel 200 includes openings 204 through which airflow may enter and/or exit panel 200 for acoustic control. The face 202 of acoustic panel 200 may include a facesheet having openings 204 which are designed to provide low drag. FIG. 4 illustrates a section cut view of a side of acoustic panel 200 illustrated by view arrows 4 of FIG. 3. FIG. 4 illustrates that panel 200 includes a core 206 which includes cells 240 defined by borders/walls 230. Each cell 240 in panel 200 is sandwiched between (i.e., encapsulated by) a facesheet 210 and a backing sheet 220, and in this embodiment each cell 240 includes a septum 400 that absorbs and controls, acoustic energy. Facesheet 210 is exposed to airflow 155 across panel 200. Furthermore, as shown in FIG. 4, openings 204 allow sound waves/vibrations from airflow 155 to enter cells 240. These sound waves from airflow 155 may then be attenuated by travel within cells 240 and/or reflection off of backing sheet 220.

Further discussion of acoustic panel 200 will be made with regard to FIG. 5, which illustrates a system that actively fabricates a facesheet. The fabrication techniques discussed herein beneficially forego traditional techniques of manually creating each cell of an acoustic panel, and utilize thermoplastic (e.g., Polyether ether ketone (PEEK) or Polyether ketone ketone (PEKK) or similar) materials in order to ensure that various different layers, liners, etc. may be bonded together via heat without a need for supplementary adhesives. Hence, an acoustic panel may be fabricated in its entirety via automated AFP layup and/or 3D printing techniques.

Figure 5:
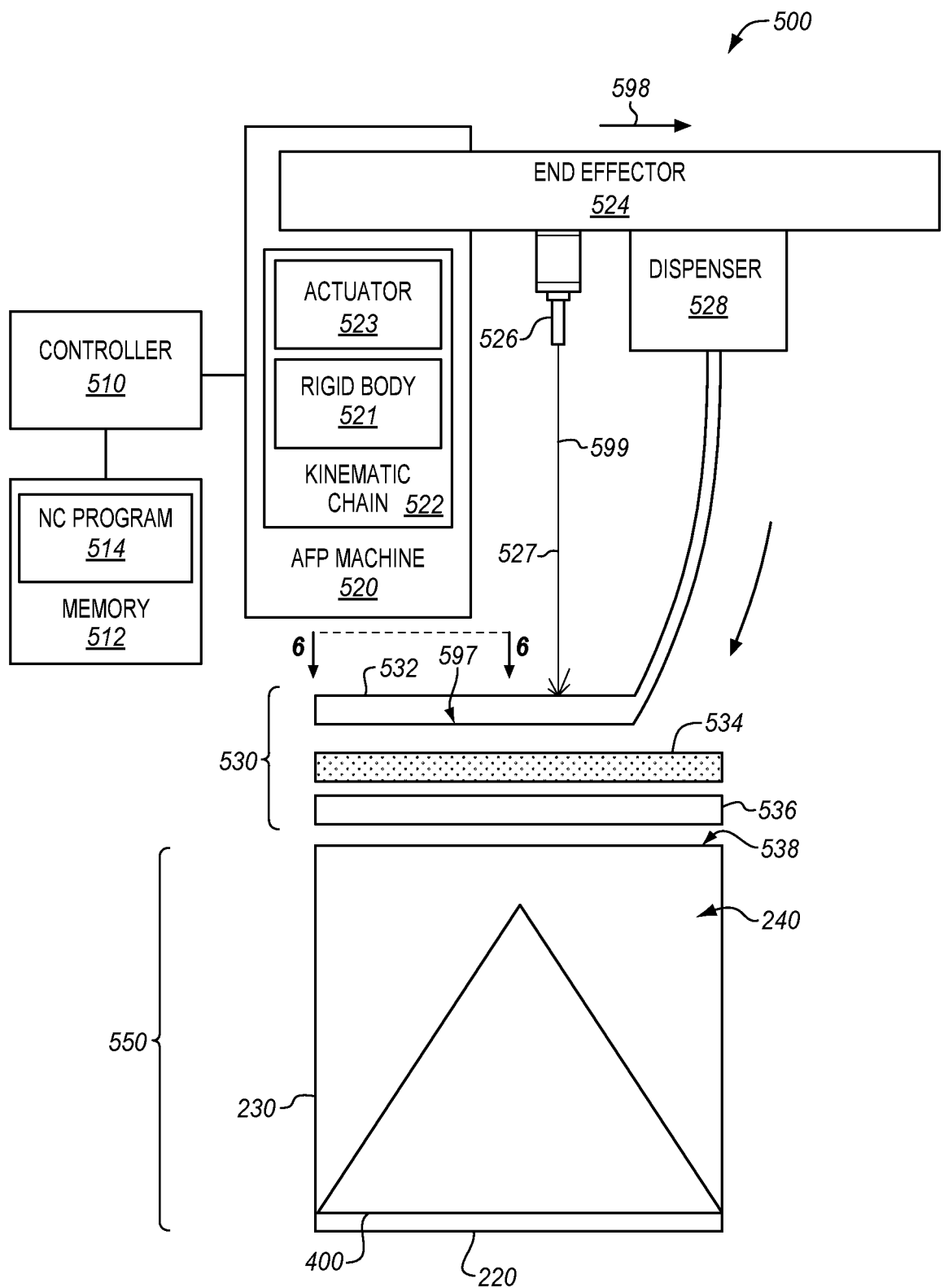
FIG. 5 is a diagram illustrating a system for fabricating acoustic paneling in an exemplary embodiment.

FIG. 5 is a diagram illustrating an automated system 500 for fabricating acoustic paneling in an exemplary embodiment. In this embodiment, system 500 includes AFP machine 520, which includes a kinematic chain 522 of rigid bodies 521 and actuators 523 that reposition end effector 524 over a core 550 of acoustic cells 240. End effector 524 includes dispenser 528, which dispenses thermoplastic CFRP and/or thermoplastic. Other 3D printable materials may also be used, such as-metals for metal structures. In one embodiment, dispenser 528 comprises a dispenser which lays up tows of thermoplastic CFRP atop core 550. In a further embodiment, dispenser 528 comprises a 3D printing device. As used herein, "thermoplastic CFRP" is a carbon fiber reinforced thermoplastic. The carbon fiber described herein may be long fiber CFRP in which multiple strands of carbon fiber are aligned parallel with each other and extend for long distances (e.g., centimeters or meters). In further embodiments, the carbon fiber may comprise short "chopped fiber" having a random orientation.

End effector 524 further includes laser 526, which emits beam 527 of laser energy 599 (e.g., infrared (IR) heat energy). This laser energy 599 is utilized to fuse different layers of thermoplastic together. In this embodiment, laser 526 follows dispenser 528 as AFP machine 520 continues in a direction of travel 598. Hence, laser 526 is capable of directly radiating laser energy 599 onto locations (L) that have just been laid-up or printed in order to heat thermoplastic material 597 to a fusing temperature (e.g., a melting temperature). This facilitates rapid fusing in order to form an acoustic panel 200

FIG. 5 further illustrates controller 510 and memory 512. Memory 512 stores Numerical Control (NC) program 514. NC program 514 includes instructions that direct elements of kinematic chain 522 and end effector 524 in laying up portions of facesheet 530. In this embodiment, NC program 514 further includes instructions for operating laser 526. These instructions may indicate when and where to activate laser 526, an amount of energy to radiate at each location where laser 526 is activated (e.g., to ensure sufficient heat transfer), etc.

As shown in FIG. 5, facesheet 530 comprises multiple components. Base layer 536 comprises thermoplastic CFRP directly laid-atop core 550. A surface 538 of core 550 is also visible. Base layer 536 may comprise multiple tows which have been laid-up in a pattern over core 550 of cells 240. In a further embodiment, base layer 536 is 3D printed to form the pattern. In either case, the pattern follows walls 230 of cells 240, and leaves a gap/opening (shown as opening/gap 600 of FIG. 6) over each cell 240. The opening enables acoustic energy to travel into and out of cell 240. The next component is liner 534, which comprises porous thermoplastic. Porous thermoplastic liner 534 covers the openings over each cell 240 defined by base layer 536. The porous nature of liner 534 enables acoustic energy to enter cell 240 for attenuation.

The final component laid-up by AFP machine 520 is cap layer 532, which comprises thermoplastic CFRP. Like base layer 536, cap layer 532 is laid-up in a pattern that leaves gaps/openings. This pattern may include openings which are shaped and arranged in order to provide low drag over acoustic cells 240 (i.e., a smooth(er) aerodynamic surface). The carbon fiber in cap layer 532 provides mechanical support to liner 534 without altering the fundamental acoustic properties of facesheet 530. The patterns described herein may follow the contours of walls 230 at core 550, and are illustrated with regard to FIG. 6 below.

Figure 6:
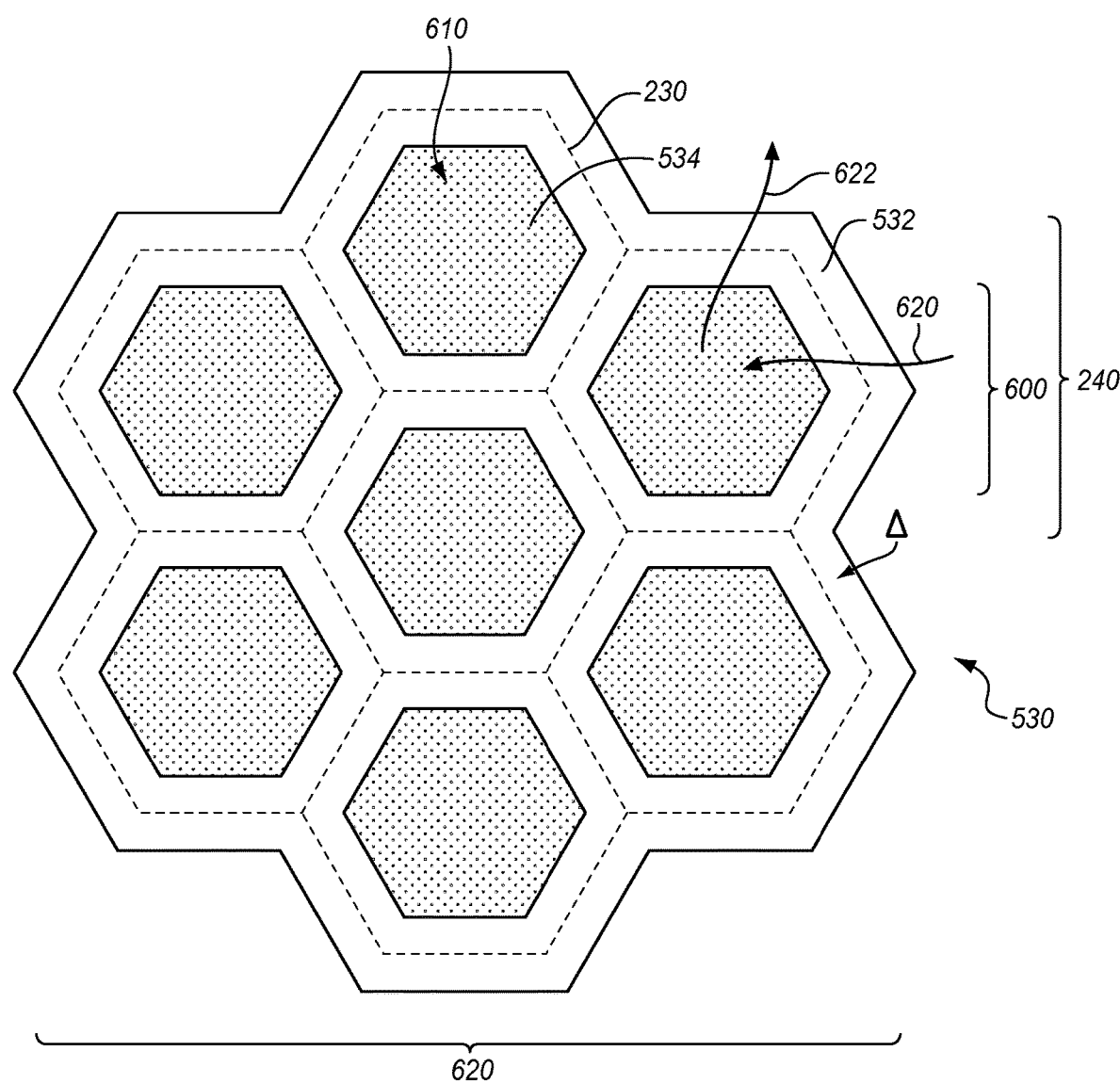
FIG. 6 is a top view of completed acoustic paneling in an exemplary embodiment.

FIG. 6 is a top view of facesheet 530 indicated by arrows 6 of FIG. 5. In this embodiment, cap layer 532 and liner 534 are visible, and cap layer 532 has been laid-up to form pattern 620. Walls 230 are located deep underneath cap layer 532, and liner 534 is visible at gaps/openings 600. Gaps 600 are aligned with gaps/openings 610 defined by base layer 536, and hence liner 534, which is permeable, is the only barrier between external acoustic energy and the internal portions of each cell 240. Only locations where cap layer 532 has been dispensed are heated by laser 526 (as indicated by Δ on FIG. 6). Acoustic energy 620 travels into a cell 240 via an opening 600 and exits the opening 600 as attenuated acoustic energy 622.

With the physical features of facesheet 530 described above, a method describing illustrative details of the operation of system 500 of FIG. 5 will be discussed with regard to FIG. 7. Assume, for this embodiment, that a user has generated an NC program 514 which includes instructions for fabricating acoustic paneling from core 550 of cells 240.

Figure 7:
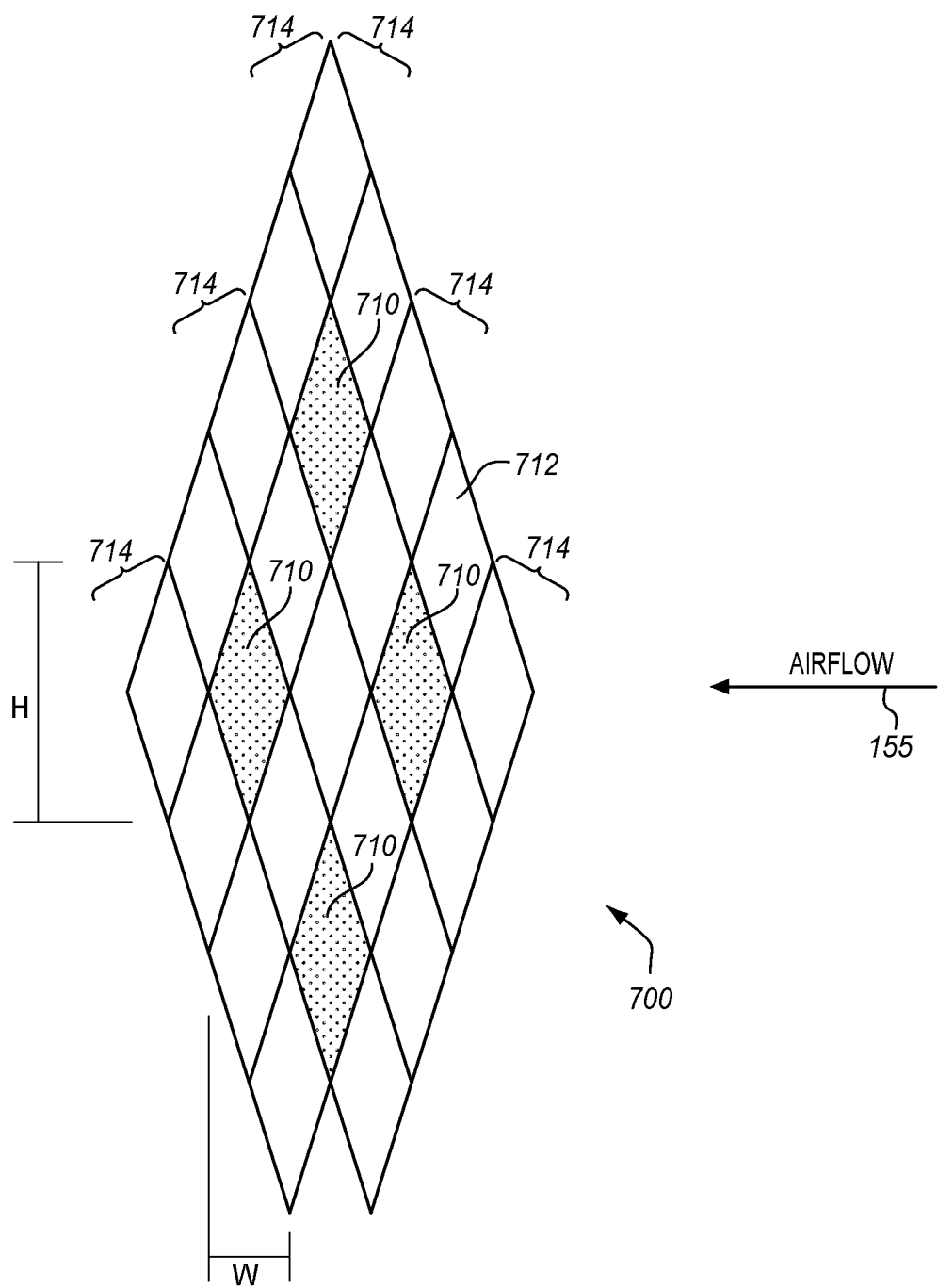
FIG. 7 is a top view a further acoustic paneling in an exemplary embodiment.

FIG. 7 is a top view of further acoustic paneling arranged in pattern 700 in an exemplary embodiment. In this embodiment, pattern 700 comprises overlapping tows 714 which define openings 710 over corresponding diamond-shaped cells. The cells are bordered by CFRP 712. As shown in FIG. 7, openings 710 are arranged with respect to airflow 155 such that the width (W, the dimension parallel to airflow 155) of each opening 710 is substantially smaller than the height (H, the dimension perpendicular to airflow 155) of each opening 710. This helps to provide low drag. That is, by directing airflow 155 across the shorter dimension (i.e., width) of each opening 710, drag is reduced. In this embodiment, dispensing of the cap layer 532 forms the gaps/openings such that a width of each gap/opening parallel to expected airflow is less than a height of each gap perpendicular to expected airflow.

An acoustic panel 200 having pattern 700 may therefore include a core 550 comprising multiple cells 240 of thermoplastic having walls that are fused together, and a facesheet 530 fused to a surface 538 of core 550. The facesheet 530 includes multiple openings 600 through which sound waves enter the cells, and a porous liner 534 within the openings provides acoustic control by keeping a majority of airflow across the openings connected and laminar, thereby reducing drag. Liner 534 is fused with the rest of facesheet 530, but remains porous.

Figure 8A:
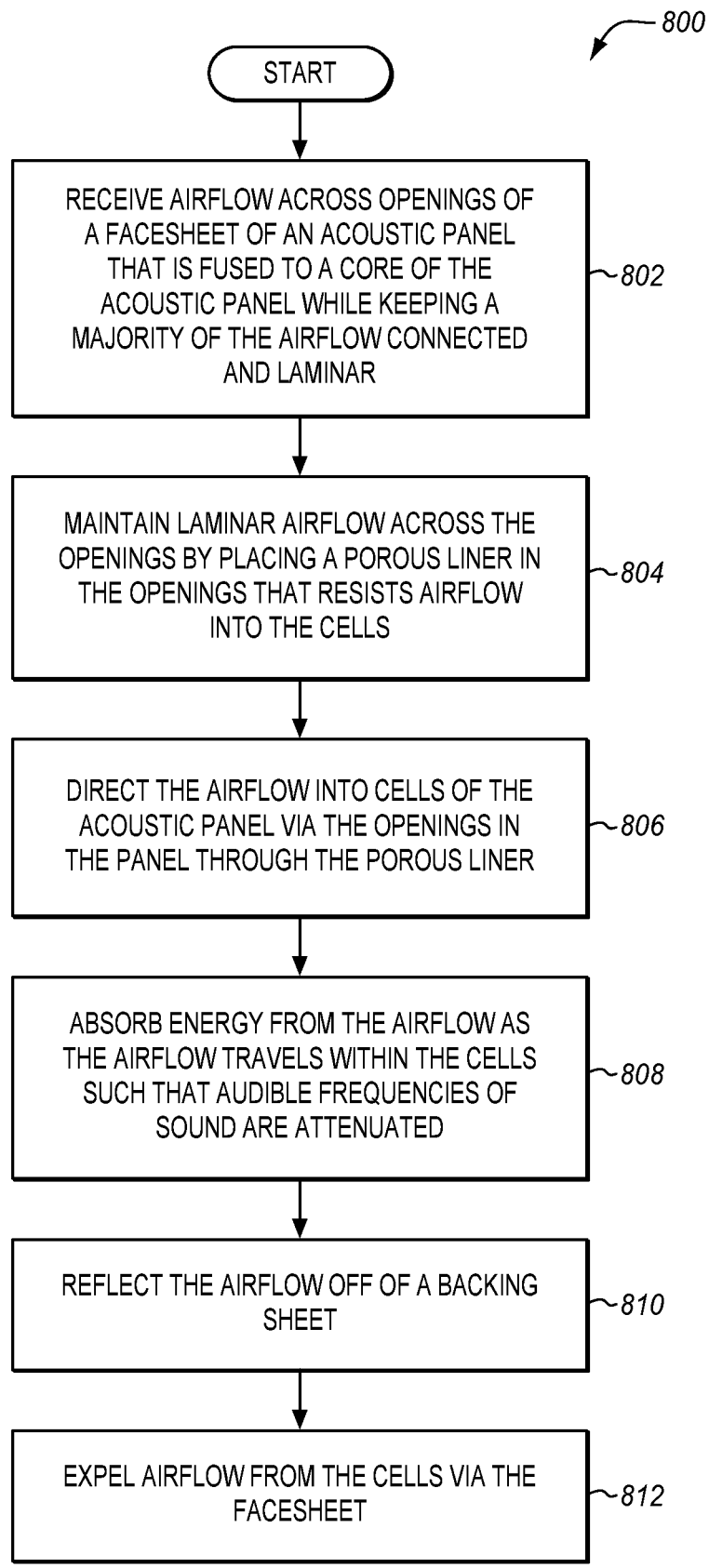
FIG. 8A is a flowchart illustrating a method for acoustic control in an exemplary embodiment.

Using the acoustic paneling described above, a method may be used for performing acoustic control of jet engine noise via an acoustic panel. This is illustrated with regard to method 800 of FIG. 8A. The method may include, for example, receiving airflow across openings of a facesheet 530 of the panel 200 that is fused to a multi-celled core 550 of the panel 200. This includes maintaining laminar airflow across the openings by placing a porous liner in the openings that resists airflow into the cells (step 804). That is, liner 534 provides some resistance to airflow entering the cell through the opening resulting in maintaining laminar flow across the openings. Thus, a majority of the airflow remains connected to itself (i.e., not disconnected, fragmentary, or turbulent) and laminar, thereby reducing drag and improving airplane performance, fuel burn etc. The method may also include directing the airflow into cells 240 of the acoustic panel 200 via the openings in the facesheet through a porous liner 534 (step 806), and absorbing energy from the airflow as the airflow travels within the cells 240 such that audible frequencies of sound generated by the airflow are attenuated by the cells 240 (step 808). The method may also include reflecting the airflow off of a backing sheet 220 for the cells 240 (step 810), and expelling the airflow from the cells 240 via the facesheet 530 (step 812).

Figure 8B:
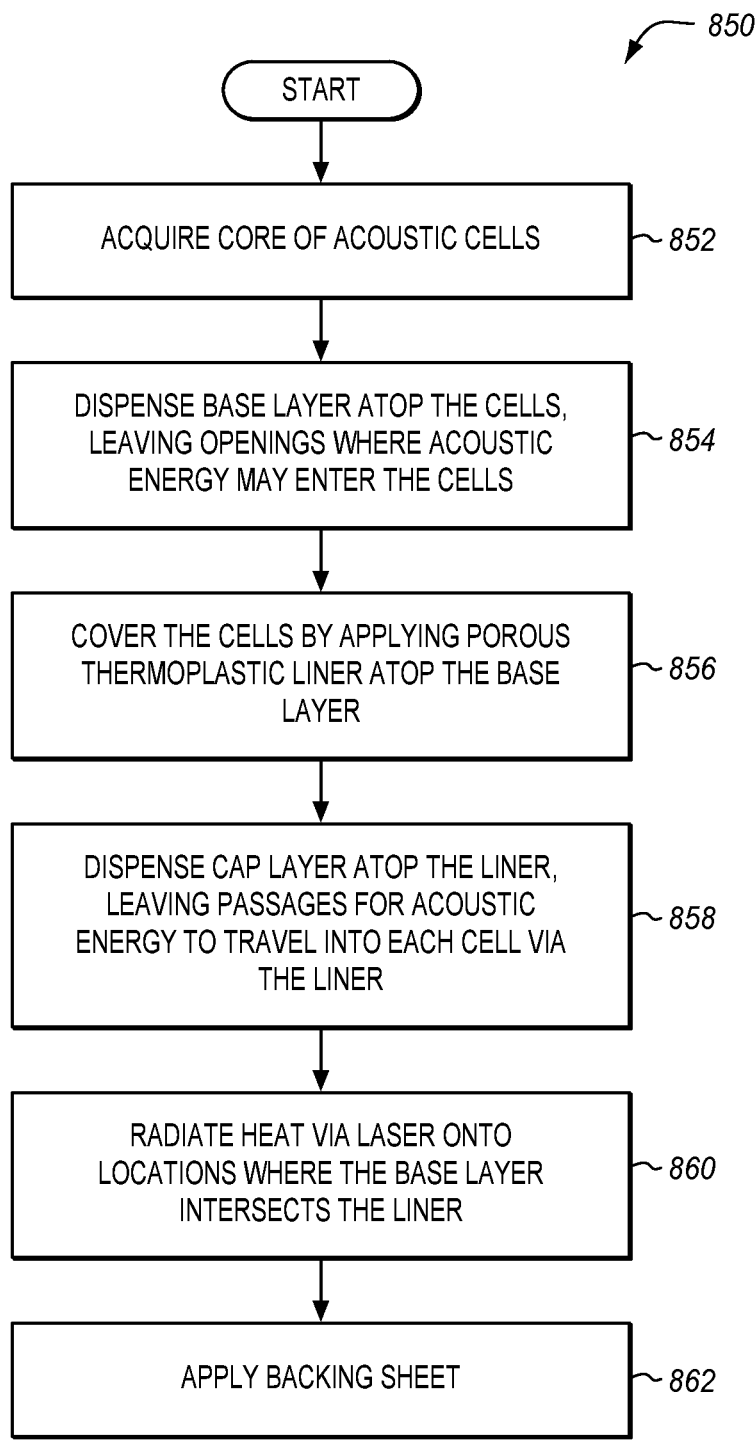
FIG. 8B is a flowchart illustrating a method for fabricating acoustic paneling in an exemplary embodiment.

FIG. 8B is a flowchart illustrating a method 850 for fabricating acoustic paneling in an exemplary embodiment. The steps of method 850 are described with reference to system 500 of FIG. 5, but those skilled in the art will appreciate that method 850 may be performed in other systems. The steps of the flowcharts described herein are not all inclusive and may include other steps not shown. The steps described herein may also be performed in an alternative order.

In step 852, system 500 acquires core 550 of acoustic cells 240. Core 550 may comprise a linear sheet of cells arranged in any suitable pattern (e.g., a tessellating pattern of hexagonal cells, triangular cells, square cells, etc.). In this embodiment, core 550 is "open" in that it has neither a backing sheet nor a facesheet. Core 550 may therefore be made as a single extruded piece of thermoplastic, or may be 3D printed thermoplastic. Core 550 may be acquired by either placing core 550 in a desired location with respect to system 500, or by actively printing core 550 via system 500. With core 550 acquired, a septum 400 may be inserted into each cell 240, or may even be 3D printed into each cell via dispenser 528.

In embodiments where dispenser 528 is a 3D printing device, dispenser 528 may 3D print individual tows (comprising thermoplastic and carbon fiber) via a separate nozzle than for components which comprise only thermoplastic. When printing thermoplastic materials that are porous in nature (e.g., where a specific level of porosity is desired in order to provide acoustic performance (enabling acoustic energy to freely enter cells 240) while also ensuring smooth properties that enhance aerodynamics), a temperature of the dispensing nozzle, an amount of material ejected, an amount of ejection pressure, and/or a cooling time may be adjusted in order to fine tune the porosity to desired characteristics.

With cells 240 ready for creation of a facesheet, system 500 initiates fabrication of a facesheet 530 covering core 550 of acoustic cells 240 (step 854). The facesheet includes three separate components. The first component is base layer 536, which is dispensed atop acoustic cells 240 by dispenser 528, and leaves openings 600 over cells 24 which allow acoustic energy to freely enter cells 240 (step 856). After base layer 536 has been applied by dispenser 528, laser 526 may fused base layer 536 to core 550 by radiating beam 527 of laser energy directly onto locations at which layer 536 has been dispensed. This heats thermoplastic polymer within base layer 536, causing fusing (e.g., via melting) between base layer 536 and core 550.

Next, cells 240 are covered by liner 534, which is applied atop base layer 536 (step 858). In one embodiment, liner 534 is applied as a continuous layer that covers gaps 600 as well as base layer 536. In one embodiment, liner 534 is a prefabricated sheet of thermoplastic having a known porosity (e.g., a percent open area of twenty to eighty percent). In further embodiments, liner 534 is printed via dispenser 528. Liner 534 attenuates acoustic energy while still enabling acoustic energy to flow into cells 240 for further attenuation. However, since liner 534 is porous, it may be desirable to enhance the structural strength of facesheet 530 (e.g., in order to ensure that materials impacting facesheet 530 do not remove substantial amounts of material from facesheet 530.

In order to ensure that desired levels of structural strength are achieved for facesheet 530, controller 510 directs dispenser 528 to dispense cap layer 532 atop liner (step 860). Cap layer 532 is laid up in the same pattern as base layer 536. Because cap layer 532 includes carbon fiber, cap layer 532 is substantially stronger than liner 534.

With the components of facesheet 530 fully in place, controller 510 operates laser 526 to radiate laser energy (e.g., IR heat) onto locations where cap layer 532 intersects liner 534 (step 862). That is, heat applied via beam 527 of laser energy from laser 526 is sufficient to cause cap layer 532 to fuse with underlying components of facesheet 530 (e.g., liner 534 and base layer 536). Controller 510 may perform this step substantially concurrently with the dispensing of layer 532, such that tows of CFRP are fused via laser 526 immediately after they are laid up. Alternatively, controller 510 may cause laser 526 to perform fusing via an entirely separate run from the run in which thermoplastic CFRP is dispensed. In either case, laser 526 is operated in such a manner that no laser energy is directly radiated onto liner 534 in gaps 600, as this could cause liner 534 to melt and become non-porous in such gaps. Thus, laser 526 selectively applies heat only to locations at which cap layer 532 overlaps liner 534. As an additional step, a continuous backing sheet may be applied (e.g., via 3D printing or AFP tow layup) in order to complete the fabrication of cells 240.

Method 850 provides an advantage over prior techniques in that it allows for rapid fabrication of large sets of acoustic cells. Furthermore, in embodiments where 3D printing techniques are utilized, large sets of acoustic cells may be fabricated to fit complex 3D contours, such as those found along the interior of an engine cowling.

EXAMPLES

In the following examples, additional processes, systems, and methods are described in the context of acoustic paneling for aircraft.

Figure 9:
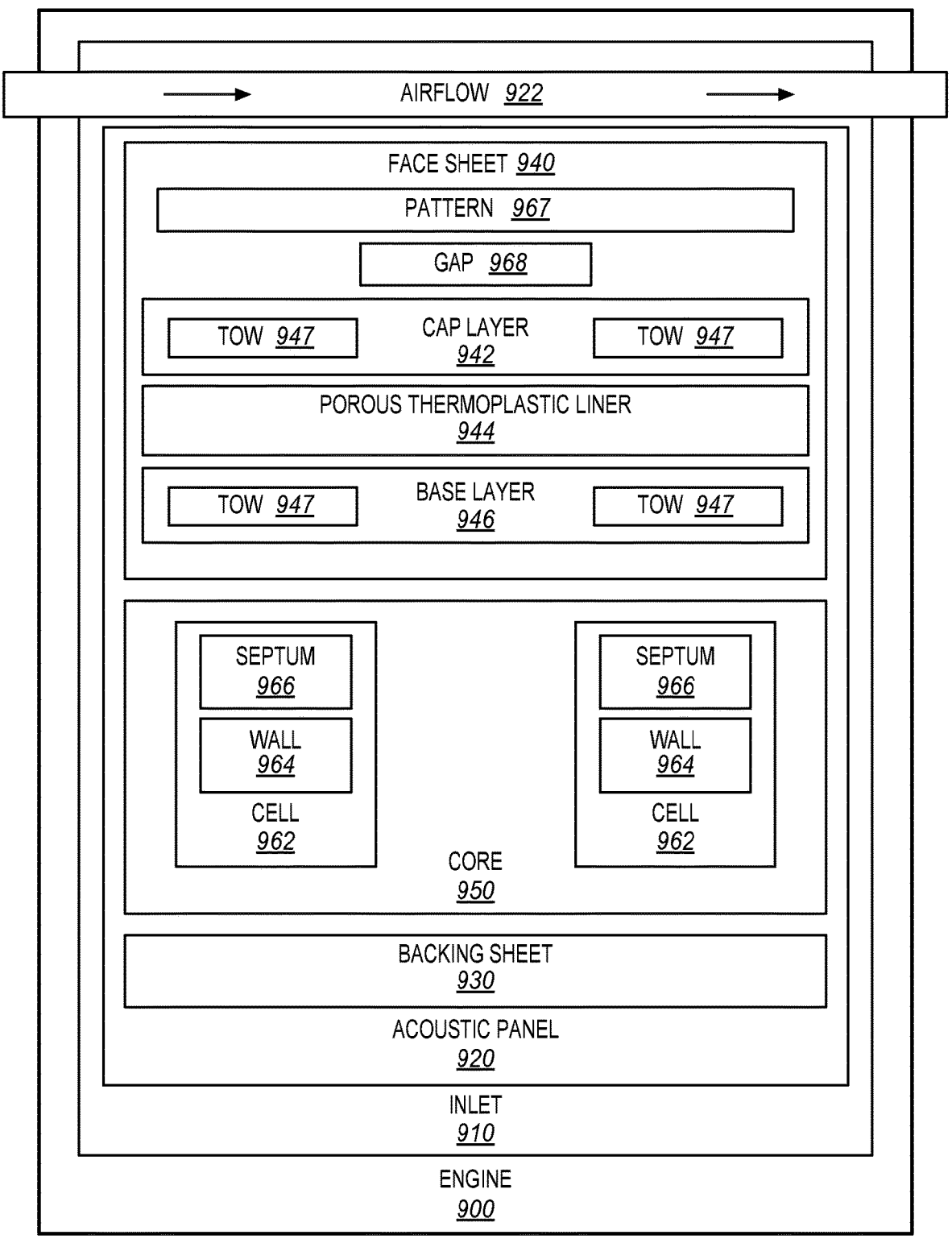
FIG. 9 is a block diagram of installed acoustic paneling in an exemplary embodiment.

FIG. 9 is a block diagram of an engine 900 utilizing an acoustic panel 920 in an exemplary embodiment. Engine 900 is a component of an aircraft that provides thrust to lift the aircraft during flight. As shown in FIG. 9, acoustic panel 920 is located within inlet 910. Panel 920 attenuates acoustic energy generated by the airflow 922 through engine 900. Panel 920 includes backing sheet 930, and core 950 includes cells 962. Each cell 962 performs attenuation of acoustic energy, and backing sheet 930 provides a backing for each cell 962. Each cell 962 is surrounded by walls 964, and may include septum 966 for attenuating acoustic energy entering and/or exiting the cell. Gap 968 between pattern 967 for facesheet 940 are also shown. These gaps enable acoustic energy to enter and/or exit cells 962. Furthermore, cells 962 are covered by facesheet 940, which includes cap layer 942 base layer 946 of thermoplastic CFRP, as well as porous thermoplastic liner 944. Facesheet 940 facilitates attenuation of acoustic energy by further attenuating acoustic energy which has entered a cell 962. Airflow 922 travels across facesheet 940 and soundwaves from airflow 922 are dampened/attenuated by cells 962.

Figure 10:
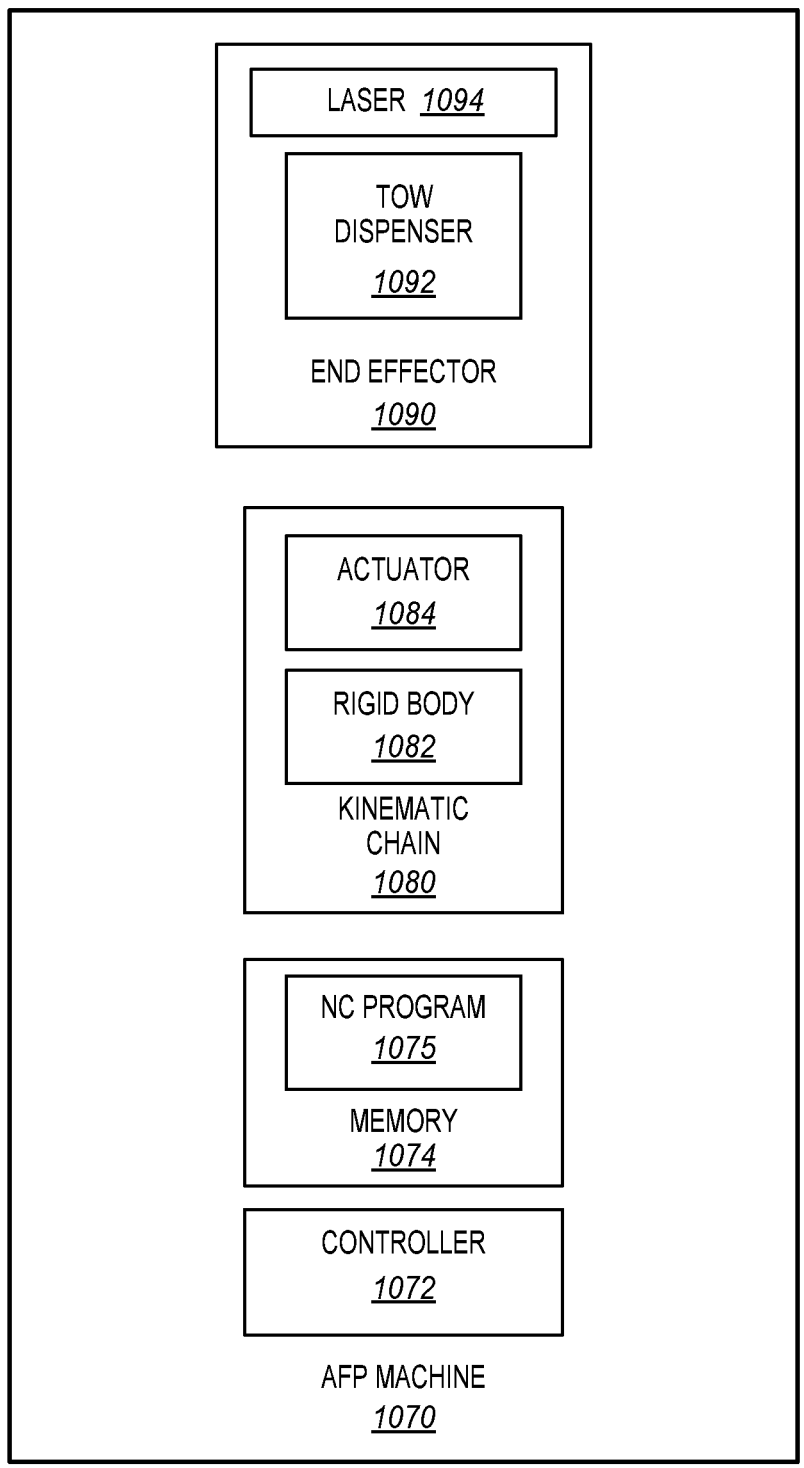
FIG. 10 is a block diagram of a fabrication system for acoustic paneling in an exemplary embodiment.

FIG. 10 depicts AFP machine 1070. AFP machine 1070 may be utilized prior to insertion of acoustic panel 1020 into engine 900 in order to fabricate acoustic panel. Thus, AFP machine 1070 is located in a manufacturing and assembly environment, while engine 900 is utilized after manufacturing and assembly is complete and an aircraft is actively operating. In this embodiment, AFP machine 1070 includes controller 1072 as well as memory 1074. Controller 1072 may comprise any suitable component for controlling the operations of an end effector, and may comprise for example a hardware processor or custom circuitry. Memory 1074 comprises any suitable device capable of storing data for reading by a computer system, and stores Numerical Control (NC) program 1075 having instructions for operating end effector 1090. The instructions may for example indicate how and where to move end effector 1090, as well as indicating when to activate dispenser 1092 and/or laser 1094. Kinematic chain 1080 includes actuator 1084 and rigid body 1082 which operate in tandem to facilitate repositioning and/or reorienting end effector 1090 based on instructions in NC program 1075. In this example, end effector 1090 includes both dispenser 1092 and laser 1094. Dispenser 1092 dispenses tows of material in order to form facesheet 940 of FIG. 9, and laser 1094 fuses cap layer 942, base layer 946, and/or liner 944 of FIG. 9 in order to adhere facesheet 940 to cells 962 of core 950 (as shown in FIG. 9).

Figure 11:
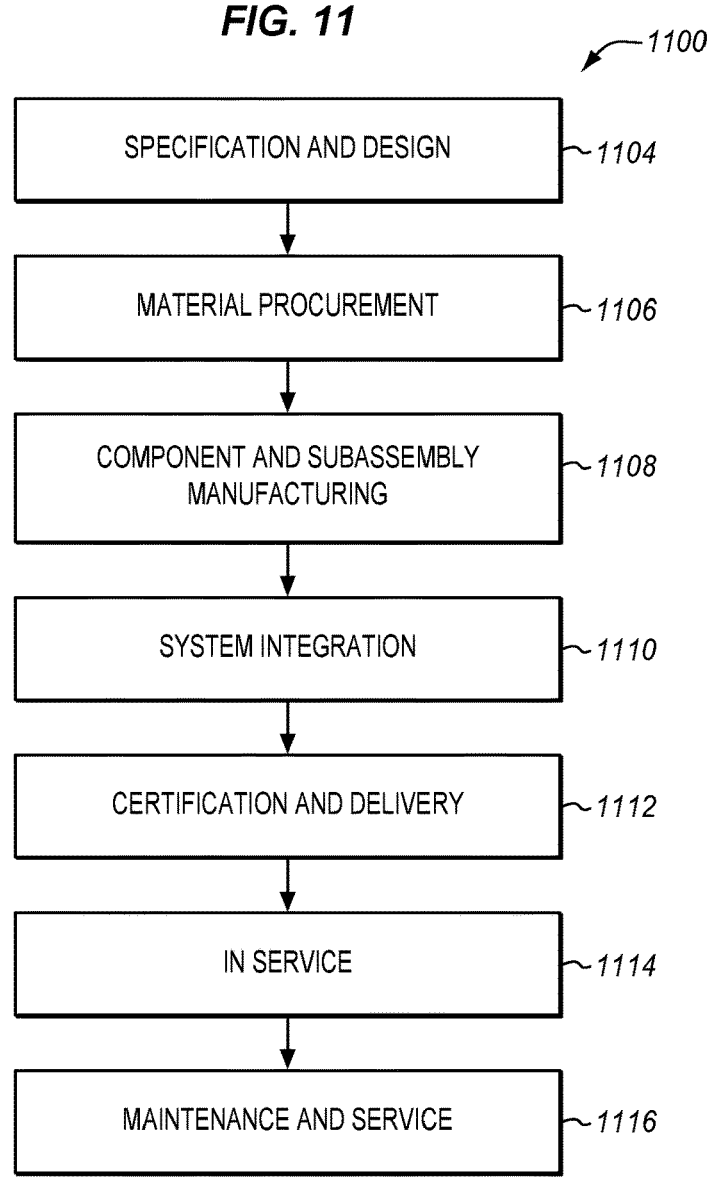
FIG. 11 is a flow diagram of aircraft production and service methodology in an exemplary embodiment.
Figure 12:
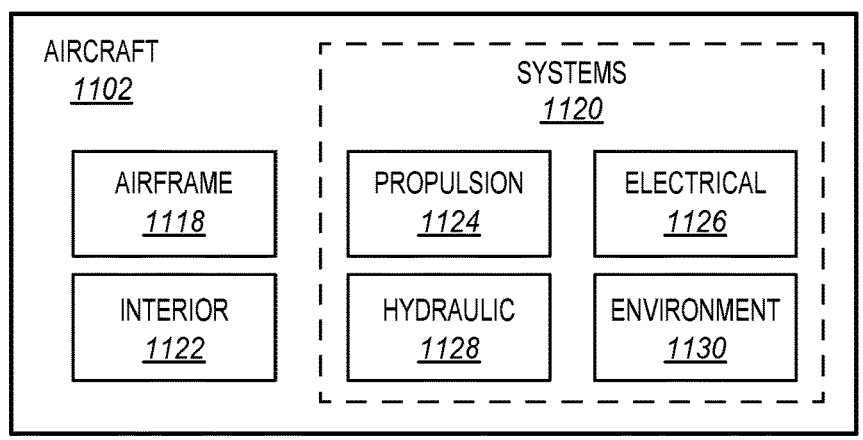
FIG. 12 is a block diagram of an aircraft in an exemplary embodiment.

Referring more particularly to the drawings, embodiments of the disclosure may be described in the context of an aircraft manufacturing and service method 1100 as shown in FIG. 11 and an aircraft 1102 as shown in FIG. 12. During pre-production, exemplary method 1100 may include specification and design 1104 of the aircraft 1102 and material procurement 1106. During production, component and subassembly manufacturing 1108 and system integration 1110 of the aircraft 1102 takes place. Thereafter, the aircraft 1102 may go through certification and delivery 1112 in order to be placed in service 1114. While in service by a customer, the aircraft 1102 is scheduled for routine maintenance and service 1116 (which may also include modification, reconfiguration, refurbishment, and so on). Apparatus and methods embodied herein may be employed during any one or more suitable stages of the production and service method 1100 (e.g., specification and design 1104, material procurement 1106, component and subassembly manufacturing 1108, system integration 1110, certification and delivery 1112, service 1114, maintenance and service 1116) and/or any suitable component of aircraft 1102 (e.g., airframe 1118, systems 1120, interior 1122, propulsion 1124, electrical 1126, hydraulic 1128, environmental 1130).

Each of the processes of method 1100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 12, the aircraft 1102 produced by exemplary method 1100 may include an airframe 1118 with a plurality of systems 1120 and an interior 1122. Examples of high-level systems 1120 include one or more of a propulsion system 1124, an electrical system 1126, a hydraulic system 1128, and an environmental system 1130. Any number of other systems may be included. Although an aerospace example is shown, the principles of the invention may be applied to other industries, such as the automotive industry.

As already mentioned above, apparatus and methods embodied herein may be employed during any one or more of the stages of the production and service method 1100. For example, components or subassemblies corresponding to production stage 1108 may be fabricated or manufactured in a manner similar to components or subassemblies produced while the aircraft 1102 is in service. Also, one or more apparatus embodiments, method embodiments, or a combination thereof may be utilized during the production stages 1108 and 1110, for example, by substantially expediting assembly of or reducing the cost of an aircraft 1102. Similarly, one or more of apparatus embodiments, method embodiments, or a combination thereof may be utilized while the aircraft 1102 is in service, for example and without limitation, to maintenance and service 1116. For example, the techniques and systems described herein may be used for steps 1106, 1108, 1110, 1114, and/or 1116, and/or may be used for airframe 1118 and/or interior 1122. These techniques and systems may even be utilized for systems 1120, including for example propulsion 1124, electrical 1126, hydraulic 1128, and/or environmental 1130.

In one embodiment, acoustic panel 200 comprises a portion of airframe 1118, and is manufactured during component and subassembly manufacturing 1108. Acoustic panel 200 may then be assembled into an aircraft in system integration 1110, and then be utilized in service 1114 until wear renders acoustic panel 200 unusable. Then, in maintenance and service 1116, acoustic panel 200 may be discarded and replaced with a newly manufactured acoustic panel 200. Enhanced automated fabrication systems such as system 500 of FIG. 5 may be utilized throughout component and subassembly manufacturing 1108 in order to manufacture acoustic panels.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

The invention claimed is:

1. A method comprising:
acquiring a core of acoustic cells; and
fabricating a facesheet covering the core by:
dispensing a base layer of material atop the acoustic cells while leaving openings into each of the acoustic cells;
covering the openings by applying a liner of porous material atop the base layer;
dispensing a cap layer of material atop the liner, wherein the cap layer is shaped in a repeating pattern that exhibits gaps over the acoustic cells, each gap being aligned with an opening defined in the base layer; and
fusing the cap layer to the liner by directly radiating laser energy solely onto the repeating pattern of the cap layer.

2. The method of claim 1 wherein:
fusing the cap layer to the liner further comprises fusing the liner to the base layer.

3. The method of claim 2 wherein:
the core of acoustic cells is thermoplastic; and
the method further comprises fusing the base layer to the core of acoustic cells by directly radiating laser energy onto locations where the base layer has been dispensed.

4. The method of claim 1 wherein:
fusing the cap layer comprises directly radiating laser energy only onto locations at which the cap layer overlaps the liner.

5. The method of claim 4 wherein:
fusing the cap layer causes the liner to become non-porous at locations where laser energy is directly applied.

6. The method of claim 1 wherein:
dispensing the cap layer forms the gaps such that a width of each gap parallel to expected airflow is less than a height of each gap perpendicular to expected airflow.

7. The method of claim 1 further comprising:
printing the base layer via three dimensional (3D) printing techniques.

8. The method of claim 1 further comprising:
printing the liner via three dimensional (3D) printing techniques.

9. The method of claim 1 wherein:
material for the base layer and the cap layer comprises Carbon Fiber Reinforced Polymer (CFRP) thermoplastic; and
material for the liner comprises thermoplastic.

* * * * *